March 17, 1964  J. R. MILES  3,125,626
ZONAL FILTER FOR CORRECTING ABERRATIONS
Filed Feb. 12, 1958  2 Sheets-Sheet 1
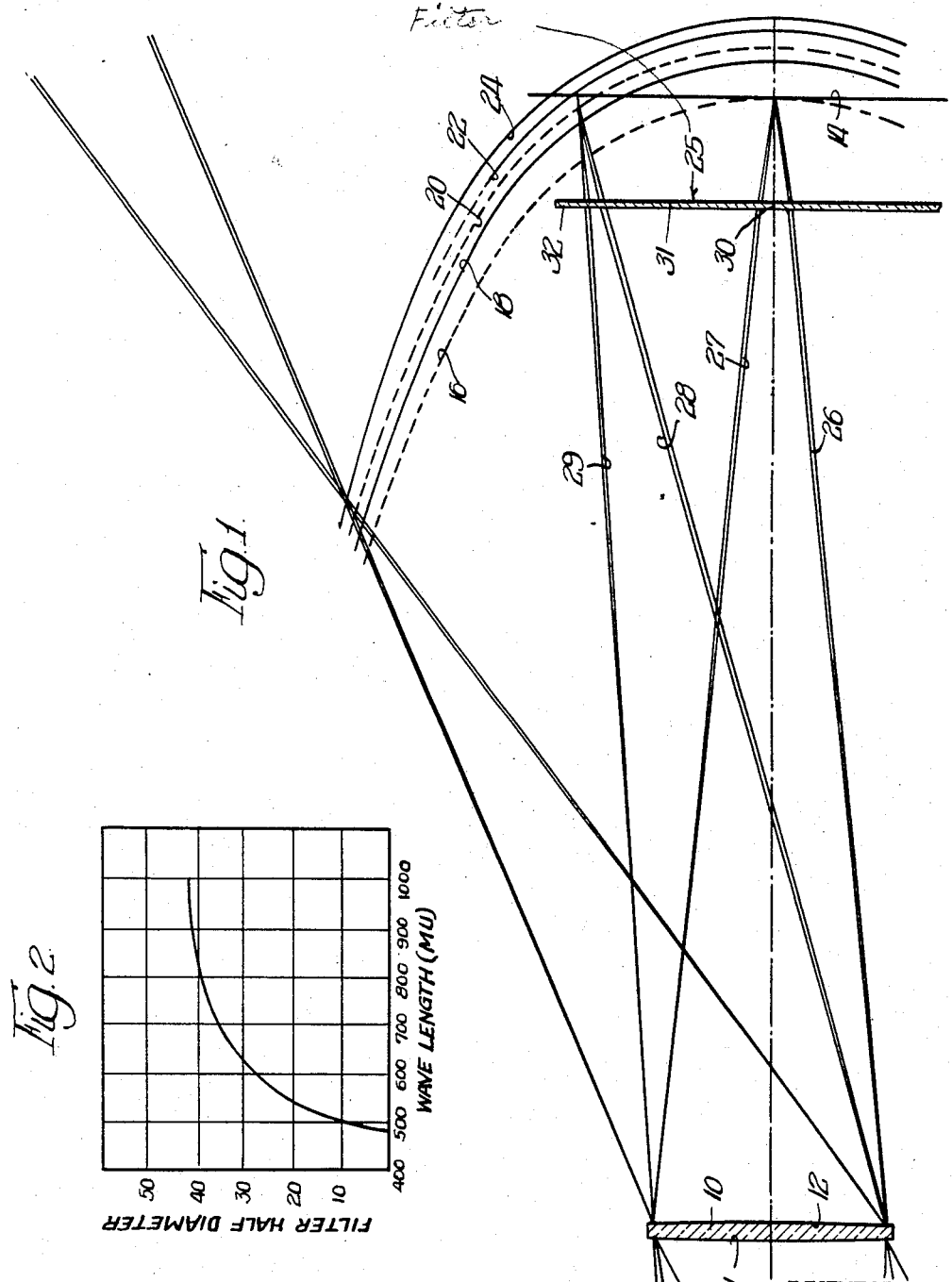
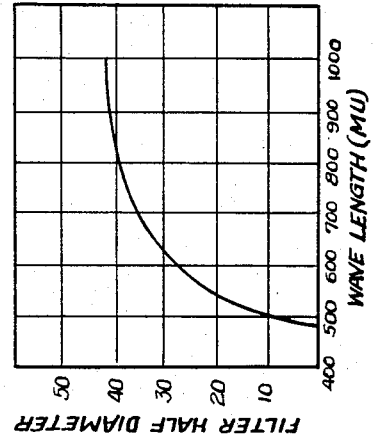
INVENTOR.
John R. Miles,

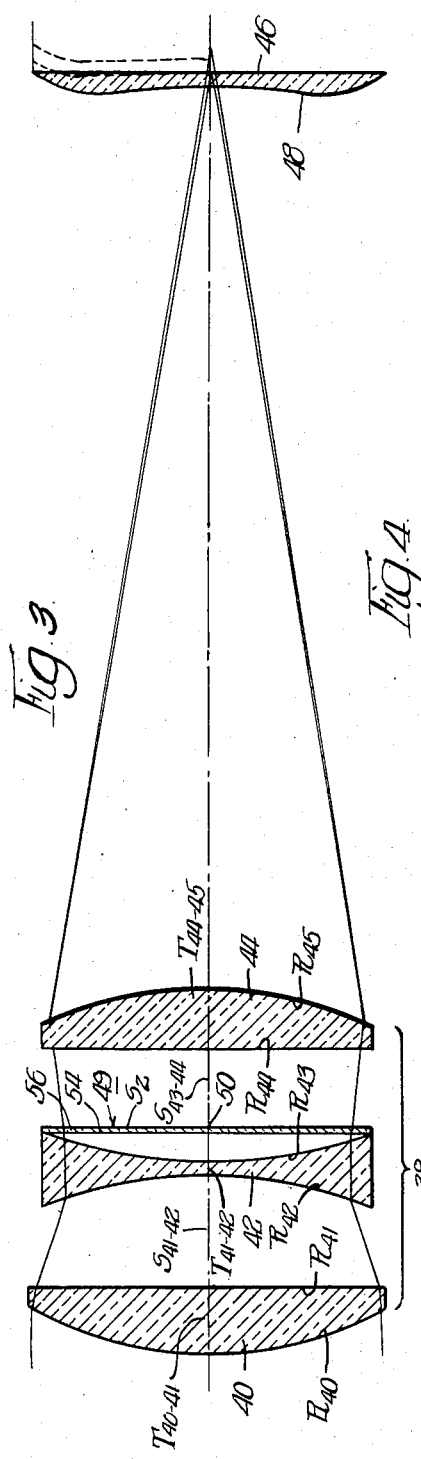
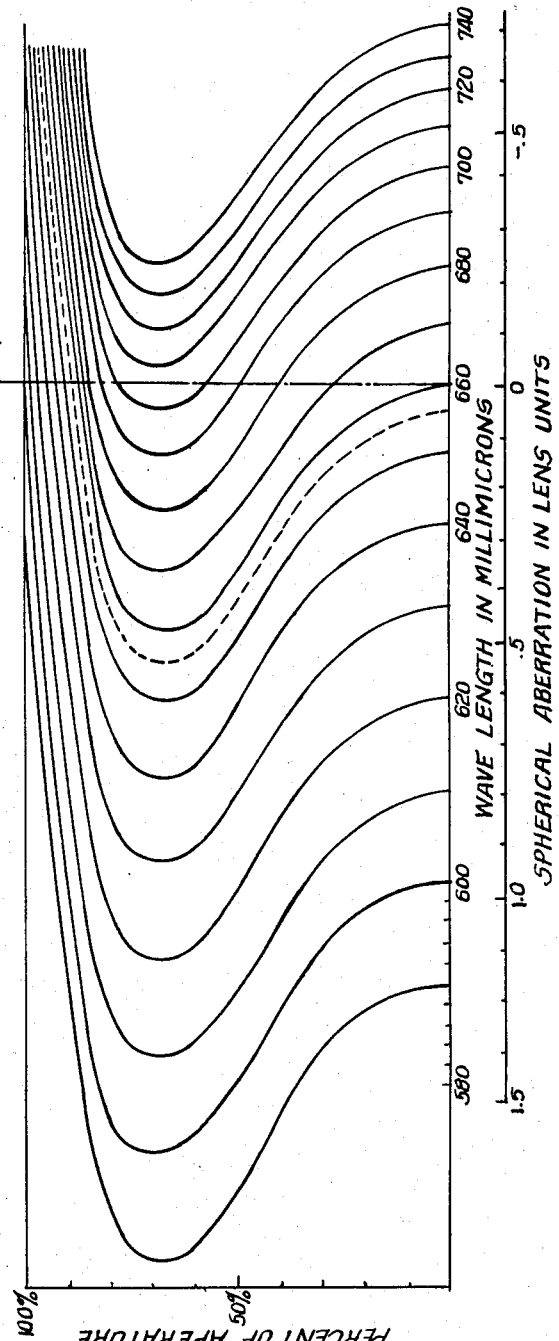

United States Patent Office 3,125,626
Patented Mar. 17, 1964

3,125,626
ZONAL FILTER FOR CORRECTING ABBERATIONS
John R. Miles, Glenview, Ill., assignor, by mesne assignments, to Chicago Aerial Industries, Inc., Melrose Park, Ill., a corporation of Delaware
Filed Feb. 12, 1958, Ser. No. 714,739
7 Claims. (Cl. 88—57)

This invention pertains to means for correcting aberrations of an optical unit and in particular to correction of aberrations by the use of selective wave length transmission.

The performance of any lens or lens system is limited by the presence of defects of the image which are known as aberrations. These aberrations can and seriously do affect the definition of the image formed by the lens or lens system. Thus the utility of any particular lens or lens system is limited by the amount of aberrations that can be tolerated.

Therefore, it is an object of the invention to provide novel means for correcting the aberrations of a lens or lens system, which vary with chromatic wave length.

Another object of the invention is to provide means for correcting the aberrations of a lens or lens system by means of selective wave length transmission.

Another object of the invention is to provide means for correcting aberration such as field curvature and spherical aberration of a lens or lens system that may be used without substantial modification of the lens system.

Another object of the invention is to provide means for correcting the field curvature and spherical aberration of a lens or lens system that is particularly adapted to be used with black and white photography.

These and other objects will be apparent upon reading of the specification with reference to the following drawings:

In the drawings:

FIGURE 1 is an illustration of a lens system embodying the invention.

FIGURE 2 is a graphical representation of chromatic wave length versus filter half diameter.

FIGURE 3 is an illustration of a modification of the lens system embodying the invention.

FIGURE 4 is a graphical illustration of the effect of chromatic aberration on spherical aberration.

As was mentioned previously, the performance of any lens or lens system is limited by the presence of certain defects known as aberrations. It has been found that these aberrations vary with the wave length of light passing through the lens system. I have discovered that by selectively filtering out some of the wave lengths and allowing others to pass through the lens system, it is possible to correct the aberrations that are a function of chromatic wave length. One such aberration that is dependent upon the chromatic wave length is curvature of the field or field curvature as it will be called hereafter.

Field curvature can best be visualized by the concept that the surface of best focus of an uncorrected lens system is not a plane but rather a curved surface having a parabolic cross-section. In other words, as the image height increases, the curvature of the focus surface increases. It has been found that the focal length and the amount of field curvature varies with the chromatic wave length of the light passing through the lens system, as was mentioned previously.

Referring now to FIGURE 1, there is shown a simple lens 10 which is representative of the numerous types that may be used in the practice of the invention. The lens 10 is of a double convex construction having surfaces 11 and 12 which have the radii of +381.1 and −381.1 respectively. The glass used in the construction of the lens 10 has an index of refraction in sodium "D" light of 1.7847 and a reciprocal dispersion ratio of 25.7. The thickness and equivalent focal length of the lens are 4 and 232.8 respectively. It is to be understood that the foregoing lens is merely an example of those that may be used and in no manner is to be construed as a limitation except as expressly provided in the claims.

This simple lens is shown as used in a camera. However, it will be apparent upon further reading of the specification that the invention may be used in conjunction with optical systems other than cameras. A film plane 14 or some equivalent device is located at the focal plane of the lens 10 of 486 millimicron wave length light which in this instance is 232.8 units. Ideally the image formed by the lens would be completely in focus at the focal plane or the film plane 14. However, it is well known that in an uncorrected lens a completely focused image would not lie on a planar surface but on a curved surface. The curved surface on which the focused image would lie in this instance when the lens is uncorrected is a parabolic surface represented by the line 16.

Another aberration which is normally present in most lens systems is chromatic aberration which is due to the focal length of the lens being a function of the wave length of light passing through the lens. In other words, the focal length of the lens and the position of the image surfaces can be varied by adjusting the wave length of the light forming the image. In the drawing there is shown a series of curved lines 18, 20, 22, 24, similar to the line 16, which are representative of the surfaces of focus for the wave lengths 589, 656, 766, and 1,000 millimicrons respectively. Furthermore, these lines including line 16, are representative of the entire series of wave lengths within the range of 486 to 1,000 millimicrons. It is to be noted in the drawings that each of the lines 16, 18, 20, 22, 24 cross or are tangent to the film plane 14 at some point. At the point at which each curved line crosses the film plane the image formed by a light of corresponding chromatic wave length would be in focus. Thus each one of the chromatic wave lengths represented by the lines 16, 18, 20, 22, 24 would form a focused image at some point on the film plane. Although each image appears in cross section as a point, it can be seen that actually they form individual annular zones. Going a step farther, it can be seen that a continuous series of focused images could be formed on the film plane 14 by the proper selectivity of the chromatic wave lengths forming each point image. In this manner, a composite image formed by a combination of these point images would be completely in focus.

Referring now to the drawing, there is shown a zonal filter 25 adapted to selectively transmit various chromatic wave lengths. Since the field curvature is independent of the aperture size, the zonal filter 25 is located remotely from the lens 10 and substantially closer to the film plane 14. For purposes of illustration, various bundles of rays 26, 27, 28, 29, are traced through the lens 10 in turn through the filter 25, and finally impinging upon the film plane at points corresponding to the various chromatic focal points. At the points at which each of these rays passes through the filter 25, the filter is such that only the wave lengh which would produce a focused image on the film plane 14 is transmitted. For instance, as shown in the drawing, a focused image would be produced at the center of the film plane by the wave length of 486 millimicrons which happens to be in the blue range. Therefore, the filter would transmit only light of that wave length at the center 30 and would be blue in appearance. Away from the center of the film plane 14 it has been found a focused image would be produced by a wave length of 589 millimicrons which happens to be within the yellow range. In this particular instance at the point 31, which is 27.6 units from the center 30, the filter transmits light of substantially 589 millimicrons. Still further out at point 32 which is 42.5 units from the center, a focused image would be produced by a wave length of 1,000 millimicrons which is in the red range. Intermediate the previously mentioned blue, yellow, red points, the filter is continually changing from blue to yellow and yellow to red, respectively. It would follow that since the lines 16, 18, 20, 22, 24, are parabolic, the rate of change of color would be a parabolic function. The rate of change of the wave length transmitted is represented in FIGURE 2 which is a graphical illustration of the wave length plotted against the height on the filter.

The filter 25 could be characterized in its preferred embodiment as a zonal color filter having a plurality of contiguous zones, each of which would transmit light of a selected wave length. The wave length transmitted by any particular zone would produce a focused image by a bundle of rays passing therethrough and impinging upon the film plane 14. It is further apparent that each zone would have a relatively small cross-section and in fact may be only a point in radial thickness. It is recognized that each zone of the filter may or may not transmit light other than the selected wave length but the maximum intensity will be of the selected wave length.

In FIGURE 3 there is shown a modification of the invention in which it is adapted to correct spherical aberration. For purposes of illustration the invention is shown as used with a triplet objective lens assembly, generally denoted by the numeral 38. The particular triplet assembly is characterized by the constructional data set forth in the following table:

[EF=101.1  BF=86.55]

| Lens | Radii | Thicknesses | Index of Refraction $N_D$ | Reciprocal Dispersion Ratio "V" |
|------|-------|-------------|---------------------------|--------------------------------|
| 40   | $R_{40}=40.1$ $R_{41}=-537$ | $T_{40-41}=6$ $S_{41-42}=10$ | 1.613 | 44.2 |
| 42   | $R_{42}=-47$ $R_{43}=+40$ | $T_{41-42-43}=1$ $S_{43-44}=10.8$ | 1.620 | 60.3 |
| 44   | $R_{44}=-234.5$ $R_{45}=-38.07$ | $T_{44-45}=6$ | 1.613 | 44.2 | where R, T, and S represent the radii, thicknesses, and air spaces respectively and the equivalent focal length and back focal length are represented by EF and BF respectively, where the back focal length is defined as the distance from the back surface of the lens to the image.

The lens units comprising the triplet assembly as shown in the drawings are optically aligned with an air space separating the lens units. Again, for purposes of illustration, the triplet assembly is shown as used in a camera having a film plane 46 which is located at the focal point of the lens assembly in light of wave length of 660 millimicrons. A typical on axis spherical aberration curve of the particular lens is represented by the line 48. It can be seen that the on axis spherical aberration for rays passing through the lens reaches a maximum at approximately ⅔ of the half diameter of the lens aperture where it begins to decrease to zero near the periphery of the lens aperture.

Referring now to FIGURE 4, there is a graphical illustration of the on axis spherical aberration curves for various chromatic wave length within the range of 590 to 740 millimicrons for this particular lens assembly. An intercept line 47 representative of the center point of the film plane has been drawn through this graphical illustration so as to intersect the various curves shown therein. The intercept line 47 is such that the curve representative of the chromatic wave length of 660 millimicrons is tangent at its center. Moving outwardly from the center of the aperture, the intercept line 47 is intersected in turn by the curves representing the wave lengths 670, 680, 690, 700, until the maximum point of aberration is reached. At that point the curves reverse direction so that the intercept line 47 is intersected in turn by the curves representative of thec hromatic wave length of 700 to 600 millimicrons.

A filter member 49 somewhat similar to that previously described is optically aligned with the triplet lens assembly for correcting axial spherical aberration. Since spherical aberration is dependent upon the size of aperture stop, the filter 49 is preferably located immediately after the lens element 42. As was mentioned previously, the chromatic wave length 660 millimicrons would produce a focused image on axis for the central portion of the aperture. Therefore, the filter 49 is adapted to transmit this particular wave length at its center 50 which happens to be in the orange range. At the point of maximum positive axial spherical aberration, the wave length of approximately 700 millimicrons would produce a focused image on axis. This point on the filter is represented by the numeral 52 at which the filter 49 would transmit a wave length of approximately 700 millimicrons which is the color red. Moving further out to the point 54, the filter would be adapted to transmit a wave length of 660 millimicrons (again orange) due to the reverse characteristics of the spherical aberration curves. Even further out at point 56 the filter would transmit a wave length of approximately 600 millimicrons which is within the yellow range to produce a focused image for the region near the periphery of the aperture. Again it should be pointed out that the previously mentioned points on the filter and the lens elements are in reality annular zones which in cross-section appear as points.

As was previously described in conjunction with the first modification of the filter, the selectivity of the filter 49 would vary from chromatic wave lengths in the ranges orange to red, red to orange, and finally orange to yellow. The rate of change of color between the various points represented by the numerals 50, 52, 54, 56, would be a function of the spherical aberration curve for the particular lens assembly.

The invention has now been described as used to correct field curvature and spherical aberration. It can be seen that the invention can also be used to correct other aberrations which vary with the chromatic wave length passing through the particular lens assembly. Examples of such aberration are coma and astigmatism. It can now be seen that this invention is particularly useful where color distortion can be tolerated. One such use is black and white photography which was previously mentioned.

Although certain specific terminology and constructional data have been used in the description, this is merely by way of example and in no manner is to be construed as a limitation. It is apparent that certain modifications may be made within the scope of the claims without departing from the spirit of the invention.

I claim:
1. A photographic device comprising a lens unit uncorrected for chromatic aberration and another aberration which is a function of chromatic wave length, a film plane located substantially at the focal point of said lens unit, and a transparent selective wave length transmission device optically associated with said lens unit and said film plane, said selective wave length transmission device comprised of a plurality of zones, each of said zones transmitting light of a substantially predetermined chromatic wave length and being optically aligned with a portion of said lens unit, said predetermined chromatic wave length being such that the chromatic aberration caused by said wave length is substantially equal and opposite to said another aberration whereby said another aberration is eliminated.

2. In a photographic device having a lens unit uncorrected for chromatic aberration and another aberration which is a function of chromatic wave length and a film plane located substantially at the focal point of said lens unit, a transparent selective wave length transmission device optically associated with said lens unit and said film plane, said selective wave length transmission device comprised of a plurality of zones, each of said zones transmitting light of a substantially predetermined wave length and being optically aligned with a portion of said lens unit, said predetermined wave length being such that the chromatic aberration caused by said wave length is substantially equal and opposite to said another aberration whereby said another aberration is eliminated.

3. A photographic device comprising a lens unit uncorrected for chromatic aberration and another aberration which is a function of chromatic wave length, a film plane located substantially at the focal point of said lens unit, and a transparent selective wave length transmission device located intermediate said lens unit and said film plane, said selective wave length transmission device comprised of a plurality of annular zones, each of said annular zones transmitting light of a substantially predetermined wave length and being optically aligned with a portion of said lens unit, said predetermined wave length being such that the chromatic aberration caused by said wave length is substantially equal and opposite to said another aberration whereby said another aberration is eliminated.

4. A photographic device comprising a lens unit uncorrected for chromatic aberration and another aberration which is a function of chromatic wave length, a film plane located substantially at the focal point of said lens unit, and a transparent selective wave length transmission device located adjacent to the aperture stop of said lens unit, said selective wave length transmission device comprised of a plurality of contiguous annular zones, each of said annular zones transmitting light of a substantially predetermined chromatic wave length and being optically aligned with a portion of said lens unit, said predetermined chromatic wave length for each of said annular zones being such that the chromatic aberration caused by said wave length is substantially equal and opposite to said another aberration whereby said another aberration is eliminated.

5. A photographic device comprising a lens unit substantially uncorrected for chromatic aberration and spherical aberration, a film plane located substantially at the focal point of said lens unit, and a transparent selective wave length transmission device located adjacent to the aperture stop of said lens unit, said selective wave length transmission device comprised of a plurality of contiguous annular zones, each of said annular zones transmitting light of a substantially predetermined chromatic wave length and being optically aligned with a portion of said lens unit, said predetermined chromatic wave length for each of said annular zones being such that the chromatic aberration caused by said wave length is substantially equal and opposite to the spherical aberration of the portion of said lens aligned therewith whereby said spherical aberration is eliminated.

6. A photographic device comprising a lens unit substantially uncorrected for chromatic aberration and field curvature, a film plane located substantially at the focal point of said lens unit, and a transparent selective wave length transmission device located intermediate said lens unit and said film plane, said selective wave length transmission device comprised of a plurality of contiguous annular zones, each of said annular zones transmitting light of a substantially predetermined chromatic wave length and being optically aligned with a portion of said lens unit, said predetermined chromatic wave length for each of said annular zones being such that the chromatic aberration caused by said wave length is substantially equal and opposite to the field curvature of the portion of said lens unit aligned therewith whereby said field curvature is eliminated.

7. An optical system comprising a lens unit uncorrected for chromatic aberration and another aberration which is a function of chromatic wave length, an image plane located substantially at the focal point of said lens unit, and a transparent selective wave length transmission device optically associated with said lens unit and said image plane, said selective wave length transmission device comprised of a plurality of zones, each of said zones transmitting light of a substantially predetermined chromatic wave length and being optically aligned with a portion of said lens unit, and said predetermined chromatic wave length being such that the chromatic aberration caused by said wave length is substantially equal and opposite to said another aberration whereby said another aberration is eliminated.

References Cited in the file of this patent

UNITED STATES PATENTS

| 2,207,411 | Pierce | July 9, 1940 |
| 2,385,770 | Birch-Field | Oct. 2, 1945 |
| 2,519,428 | Birch-Field | Aug. 22, 1950 |
| 2,909,097 | Alden et al. | Oct. 20, 1959 |

FOREIGN PATENTS

| 158,287 | Australia | Aug. 17, 1954 |
| 155,640 | Great Britain | Dec. 22, 1920 |

OTHER REFERENCES

Ordnance Department, Document No. 2037, The Manufacture of Glass and of Optical Systems, G.P.O., Washington, D.C., 1921, pp. 60–61.